UNITED STATES PATENT OFFICE.

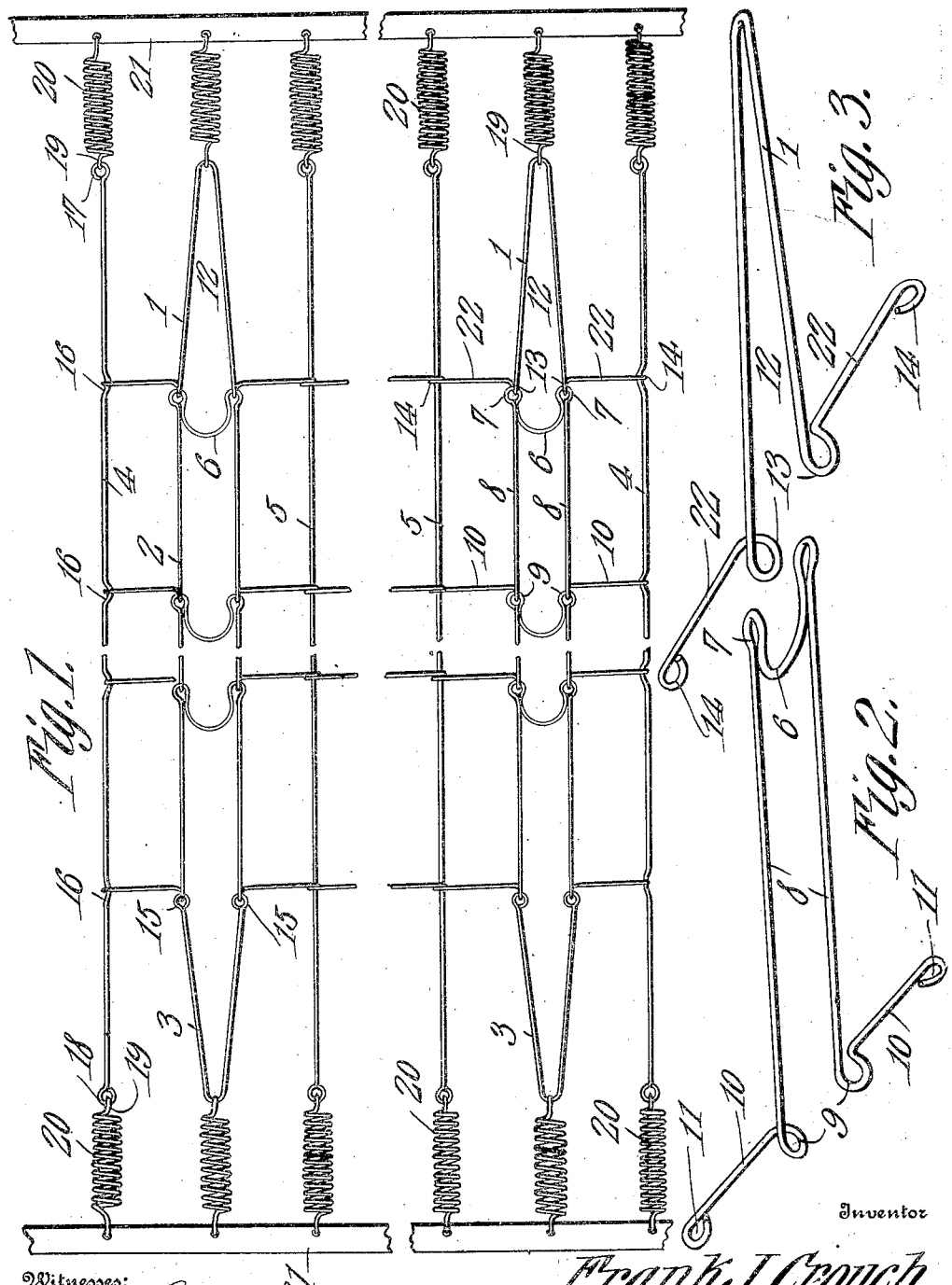

FRANK J. CROUCH, OF SEATTLE, WASHINGTON, ASSIGNOR OF TWO-THIRDS TO JAMES A. BECKER AND HARTLEY D. SMITH, OF SEATTLE, WASHINGTON.

FABRIC.

No. 929,280.  Specification of Letters Patent.  Patented July 27, 1909.

Application filed February 4, 1909. Serial No. 476,082.

*To all whom it may concern:*

Be it known that I, FRANK J. CROUCH, a citizen of the United States, residing at Seattle, in the county of King and State of Washington, have invented a new and useful Fabric, of which the following is a specification.

This invention relates to elastic metallic fabrics such as are used in the construction of bed bottoms, couches, and the like.

The object of the invention is to produce a fabric of this character that shall be simple of construction, efficient and durable in use, and easy to manufacture, and in which the various elements shall be so fashioned and combined as to secure the greatest resiliency or spring action with the least wear and deterioration of the co-acting parts.

With the above and other objects in view, as will appear as the nature of the invention is better understood, the same consists in the novel form of starting links and filler links, and in the combination of the parts of an elastic fabric, as will be hereinafter fully described and claimed.

In the accompanying drawings forming a part of this specification, and in which like characters of reference indicate corresponding parts;—Figure 1 is a view in side elevation of a section of elastic fabric constructed in accordance with the present invention. Fig. 2 is a perspective detail view of one of the filler links. Fig. 3 is a similar view of one of the starting links.

The fabric consists of interlinked or interlooped starting loops 1, filler links 2, tail links 3, and suspension wires 4 and 5.

Each filler link consists of a length of resilient wire bent upon itself to provide a curved bridge 6, thence rebent to form two loops 7 that lie exteriorly of and preferably in the same plane as the bridge, thence extended in approximate parallelism to provide the side members 8 of the links, the length of which determines that of the link, thence bent to form two loops 9 disposed at right angles to the bridge loops, and thence bent at right angles to the side members 8 and in opposite directions to provide attaching arms 10, the terminals of which are formed into suspension wire engaging eyes 11.

Each starting link consists of a length of resilient wire that is bent upon itself to form an approximately V-shaped yoke 12, the members of which are bent to provide two loops 13 disposed at right angles to the plane of the yoke, and thence projecting in opposite directions and approximately at right angles to the yoke, the terminals of the members being formed into suspension wire engaging eyes 14.

Each tail link consists of a length of resilient wire bent to approximately V-shape and provided with terminal eyes 15.

The suspension wires 4 are shown as provided with seats or kinks 16 that are engaged by the eyes 11 and 14 of the starting links 4 and filler links. The suspension wires 5 are devoid of the kinks, although they may be so constructed, if preferred, but generally, it will only be necessary to provide the two outside suspension wires with the seats.

The ends of each of the suspension wires are formed into eyes 17 and 18, the eyes 17 being formed before the members of the fabric are assembled, and the eyes 18 being formed after the members of the fabric are assembled. These two sets of eyes engage with the inner terminals 19 of coiled springs 20, the outer terminals of which are hooked into end bars 21.

When the elements of the fabric are assembled, the yokes of the starting links are engaged with the inner terminals of the coiled springs 20, and the loops 13 are interlooped with the loops 7 of the filler links, this order being maintained throughout the entire structure. The eyes 11 and 14 of the filler links and starting links are engaged with the suspension wires in the manner shown in Fig. 1.

After all of the different links have been assembled, the eyes 18 of the suspension wires are formed and these are brought into engagement with the hooked terminals of certain of the coiled springs 20, the other springs being engaged by the bends of the tail links 3, the eyes 15 of which are interlooped with the loops 9 of the filler links.

It will be noted, by reference to Fig. 1, that the bridges 6 of the filler links project inward between the side members 8 thereof, and may be extended to a greater distance than that shown. This bridge not only operates to hold the sides of the filler links properly spaced apart and in parallelism, but also gives a spring to the fabric sidewise, thus materially increasing the resiliency of the fabric as a whole.

The provision of the seats 16 in the suspension wires 4 is also important, inasmuch as the outer arms of the starting links and filler links will be held against any sliding movement on the wires.

The improvements herein described, while simple in character will be found thoroughly efficient for the purpose designed, and will co-act in the production of a durable, practical and wear resisting fabric for the purpose stated.

I claim:—

1. In a fabric such as described, a filler link consisting of a length of resilient wire bent upon itself to provide a curved bridge, thence rebent to form two loops lying exteriorly of and substantially in the same plane as the bridge, thence extended in approximate parallelism to provide the side members of the link, the length of which determines that of the link, thence bent to form two loops disposed at right angles to the bridge loops, and thence bent at right angles to the side members and in opposite directions to provide attaching arms, the terminals of which are formed into suspension wire engaging eyes.

2. In a fabric such as described, a filler link comprising two approximately parallel members connected at one end by a curved bridge that projects between the members and defines in conjunction therewith a pair of loops, the free ends of the members being bent to provide two loops disposed at right angles to the bridge loops and thence projecting in opposite directions from and at approximately right angles to the members to provide attaching arms, the terminals of which are formed into eyes that are disposed at right angles to the attaching arm loops.

3. In a fabric such as described, a starting link consisting of a length of resilient wire bent upon itself to form an approximately V-shaped yoke, the members of which are bent to provide two loops disposed at right angles to the plane of the yoke and thence projecting in opposite directions from and approximately at right angles to the yoke, the terminals of the members being formed into suspension wire engaging eyes.

4. A fabric such as described, comprising a plurality of starting links having intermediate loops, and lateral arms provided with eyes, a plurality of filler links each embodying a curved bridge and a pair of loops to interlock with those of the starting links, and provided further with laterally extending arms having terminal eyes and intermediate loops, tail links having eyes to interlock with the intermediate loops of the filler links, suspension wires threaded through the eyes of the starting links and filler links, and provided with terminal eyes, the exterior suspension wires being provided with seats to be engaged by the eyes of the starting and filler links, end bars, and coiled springs carried by the bars and engaging with the eyes of the suspension wires and the loops of the tail links and starting links.

In testimony that I claim the foregoing as my own, I have hereto affixed my signature in the presence of two witnesses.

FRANK J. CROUCH.

Witnesses:
   HARTLEY D. SMITH,
   JAMES A. BECKER.